United States Patent [19]

Pujol

[11] 4,002,111
[45] Jan. 11, 1977

[54] CONTINUOUS-FLOW WINE-MAKING APPARATUS

[76] Inventor: Andre Joseph Pujol, 11120 Argeliers, France

[22] Filed: Nov. 24, 1975

[21] Appl. No.: 634,737

[30] Foreign Application Priority Data

Dec. 12, 1974 France .................. 74.40945

[52] U.S. Cl. .................................. 99/276
[51] Int. Cl.$^2$ .............................. C12B 1/10
[58] Field of Search ......... 99/276, 275, 277, 277.1, 99/277.2

[56] References Cited

UNITED STATES PATENTS

| 136,741 | 3/1873 | Luquet | 99/277 X |
|---------|--------|--------|----------|
| 2,536,994 | 1/1951 | Cremaschi | 99/276 X |
| 3,478,669 | 11/1969 | Lanes | 99/276 |
| 3,486,437 | 12/1969 | Bazhenov et al. | 99/276 |

Primary Examiner—Edward L. Roberts
Assistant Examiner—Arthur O. Henderson
Attorney, Agent, or Firm—Wenderoth, Lind & Ponack

[57] ABSTRACT

In a continuous-flow wine-making apparatus comprising an external tower to which the grape juice to be transformed into wine is admitted and an internal concentric tower from which the manufactured wine is withdrawn, the internal tower is divided by an inclined bottom into two separate superimposed rooms, the wine is withdrawn from an intermediate place of the upper room and the solid refuse from the lowermost portion of this room, and a temperature-regulating fluid flows through the lower room.

10 Claims, 5 Drawing Figures

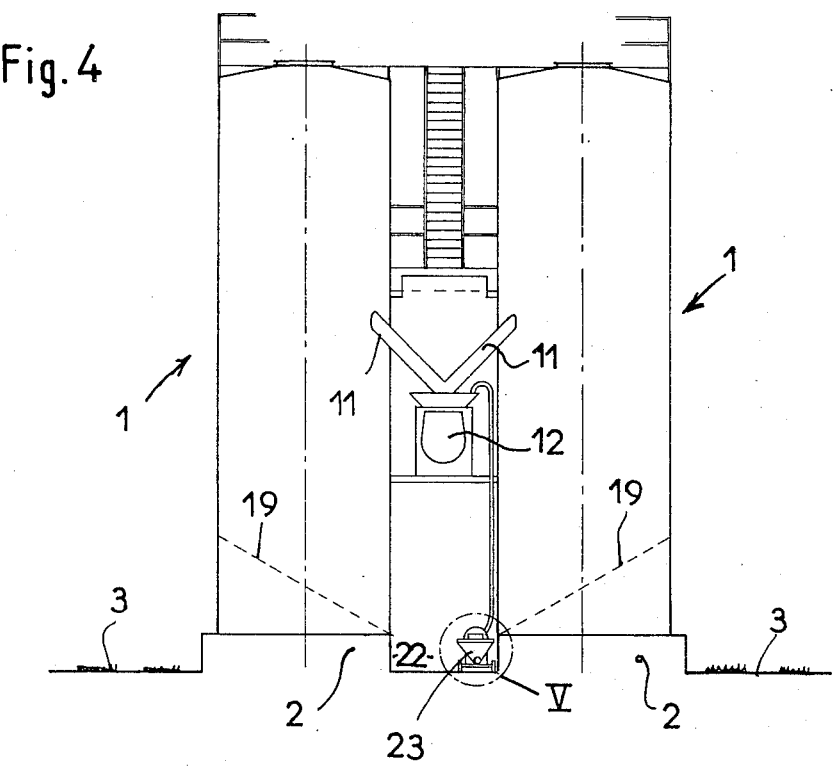
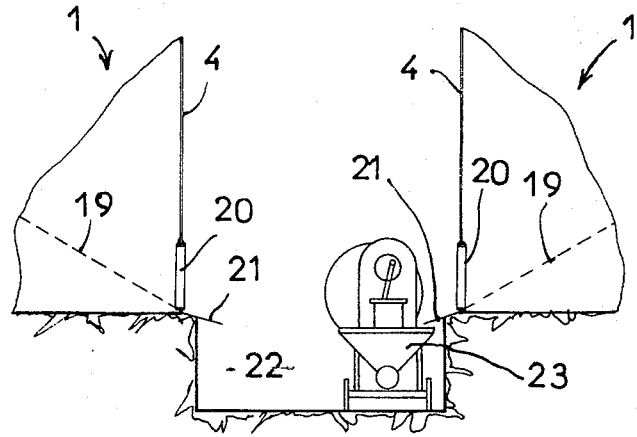

CONTINUOUS-FLOW WINE-MAKING APPARATUS

BACKGROUND OF THE DISCLOSURE

As is generally known, various wine-making apparatus are at the present time utilised in the wine industry, which show the advantage of enabling to manufacture a good quality wine with a minimum of vat means and of running staff.

The industrial wine-making appparatus which have been manufactured until now show however in use a lack of flexibility, especially when it is desired to empty them completely in order to work with another quality of vine.

Besides the continuous-flow removal of the marc performed in this type of apparatus, it is indispensable, in order to shift from a quality of vine to another, to remove the grape stalks and the pips which accumulate on the bottom of the vats. Until now, once the wine had been removed, such a removal was performed manually, man holes being provided at the base of the towers of the wine-making apparatus.

An object of the present invention is to avoid the drawbacks of the known wine-making apparatus. A further object is to allow the manufacture of a plant suitable for treating middle-sized vintage bulks. Still another object is to secure a more flexible operation which lends itself to the treatment of vintages of the most varied types.

SUMMARY OF THE INVENTION

The two-tower wine-making apparatus according to the invention is essentially characterized by the fact that its central tower is divided by an intermediary inclined bottom into an upper wine room along which runs the annular filtering grid and a lower room which is entirely filled with a thermal regulation fluid, especially cooling water, hot water or heating steam.

According to another feature of the invention, the intermediary bottom which is inclined with respect to the horizontal is continued at its lower edge by channels for removing the deposits which accumulate below the grid for filtering the wine.

In a preferred embodiment, the slope of the intermediary grid is of about 30°.

According to still another feature, the annular external vat, which extends from the bottom to the top of the wine-making apparatus, is provided at its bottom with a controlled-opening door which gives access to a ramp for removing the deposits of the annular tower.

In a preferred embodiment of the invention, a trench, in which can run a small wagon receiving the deposits which flow downwardly from the inclined bottom of the apparatus through the controlled-opening door is provided at the base of the apparatus in its basement.

According to a further feature of the apparatus, in order to ensure the satisfactory operation of the apparatus and to control the different temperature zones which extend from the bottom to the top of the apparatus, an inlet and an outlet for a cooling fluid are provided, in order to ensure the flow of this fluid, in the central cooling zone, respectively at the base of the central tower and at the point where the wall of the cooling room meets the intermediary bottom separating this room from the manufactured-wine mass.

BRIEF DESCRIPTION OF THE DRAWINGS

FIG. 4 is a front elevation of the plant shown in FIGS. 2 and 3;

FIG. 5 is a diagrammatic view, drawn to a larger scale, of the device for removing the deposits which is the object of the circular casing of FIG. 4.

DESCRIPTION OF THE PREFERRED EMBODIMENT

Figure 1:
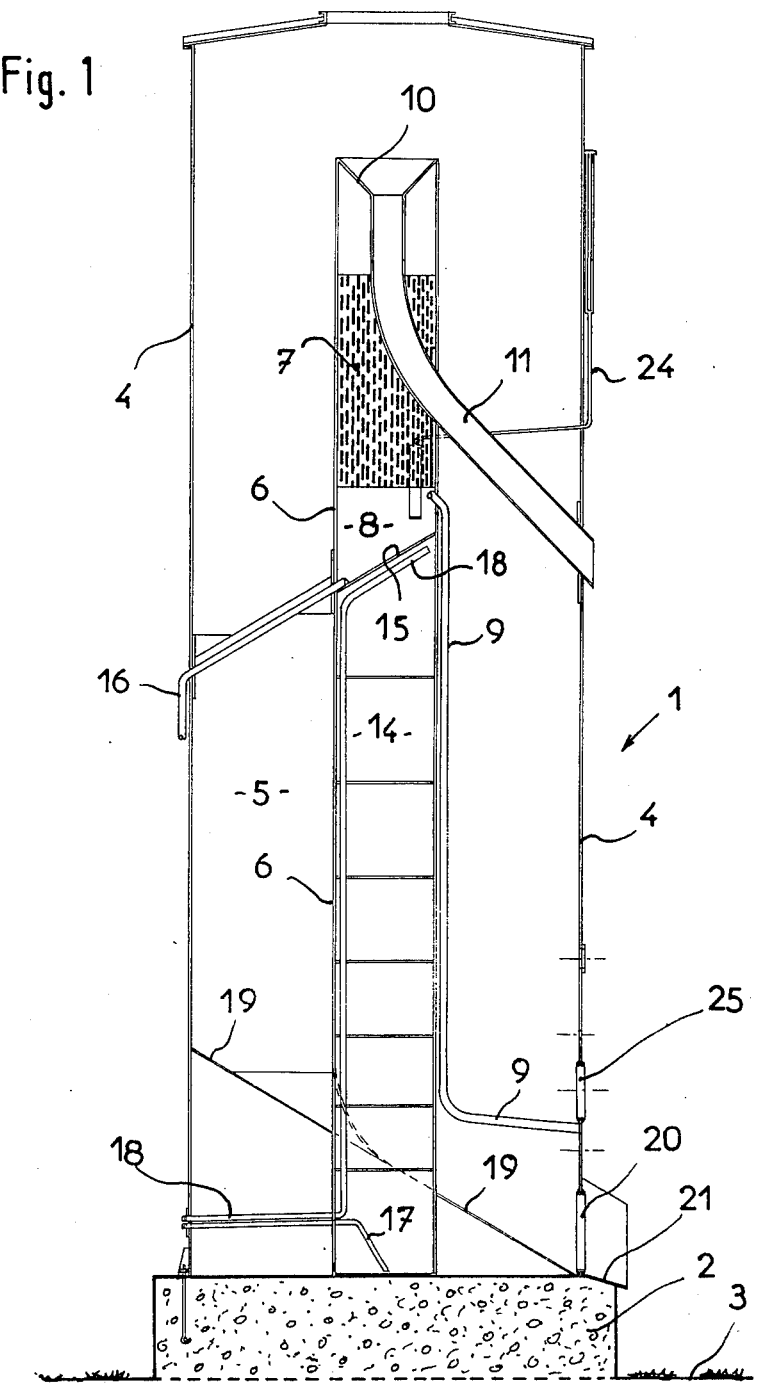
FIG. 1 is a part sectional elevation of a wine-making apparatus according to the invention.

Referring to FIG. 1, the wine-making apparatus according to the invention, generally designated by numeral 1, is secured to a base 2 made of concrete or the like and resting on the earth 3.

The apparatus, which is of the two-tower type, has an external cylindrical wall 4 which forms the external portion of an annular vat 5 limited internally by an internal wall 6 which is the external wall of a central vat which is coaxial with the external one.

This central vat comprises at its upper part, as known per se, the wine grids 7, which serve to filter the wine produced in the annular vat 5, before this wine reaches an upper room 8, from which it is pumped through a vertical pipe 9 which runs along the central vat and through the annular vat 5 to finally reach, outside the wall 4, a pumping station.

Figure 3:
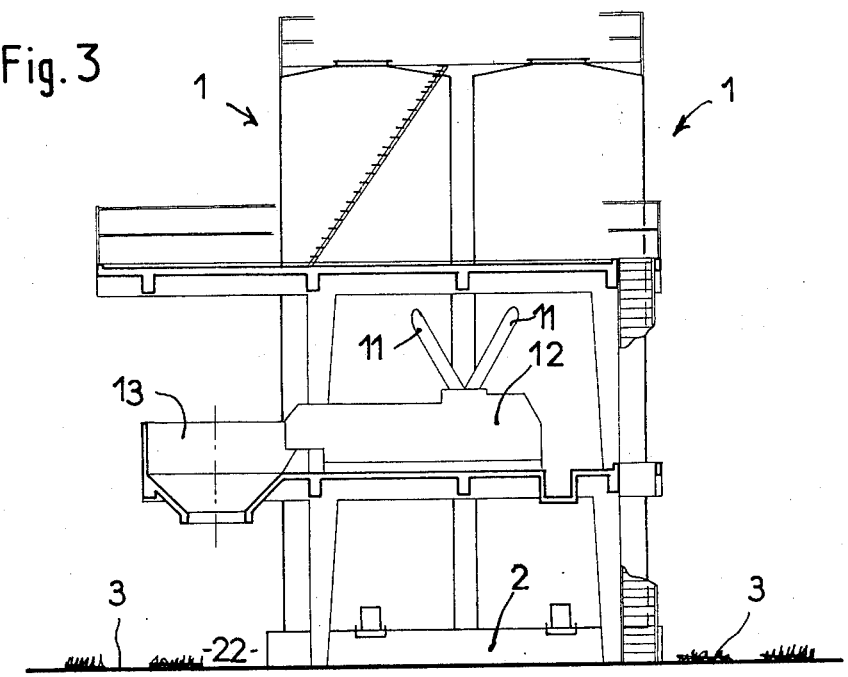
FIG. 3 is a diagrammatic elevation corresponding to FIG. 2.
Figure 2:
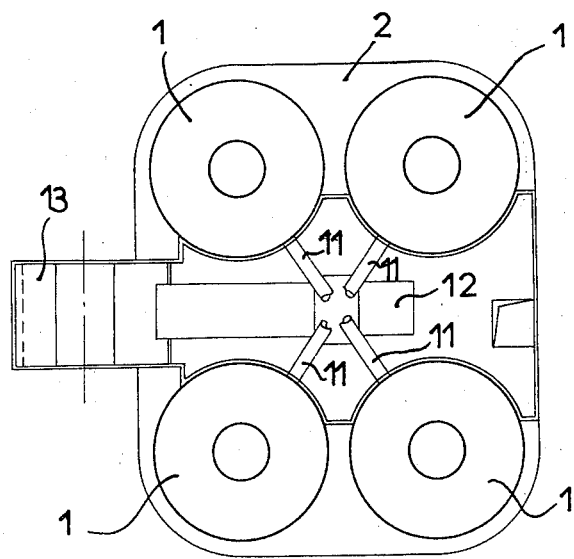
FIG. 2 is a diagrammatic plan view showing four wine-making apparatus according to the invention co-operating so as to constitute a single unit.

The upper room 8 of the central tower also comprises the conventional hopper 10 for removing the marc, which communicates with the outside of the apparatus by a channel 11 which conveys downwardly the marc (see FIGS. 2-4) to a removing device 12 leading to a lateral hopper 13 designed for loading vehicles or the like.

The central tower is divided into the above mentioned room 8 and a room 14, which are separated from each other by an intermediary inclined bottom 15, which leads to a pipe 16 for removing the decantation dirt impurity which have accumulated on the bottom of the room 8 used as wine vat.

As regards room 14, limited by wall 6, it is preferably made, as is the wall 4 of the apparatus, of rustless steel. This allows to pre-manufacture in works the central part of the apparatus, which can easily and rapidly be assembled on site from annular parts welded to one another.

This lower central part of the apparatus is used as cooling zone for the wine which is being formed in the annular part 5. To this end, the room 14 is filled with a cooling liquid, preferably water, which is caused to flow continuously owing to an inlet tube 17 and an outlet tube 18 opening at the bottom and the top of room 14, respectively.

In order to remove the water inside room 14 where it is warmest, tube 18 ends at the highest point of this room, that is, the highest point where the intermediary bottom 15 meets the wall 6 of the central tower.

In order to allow at the same time an easy removal of the refuse, such as grape stalks, pips and the like, which accumulates at the bottom of the annular tower 5, the latter is provided at its lower portion with a sloping bottom 19 the lower portion of which leads to an emptying door 20 lying flush with a removing ramp 21 which (see FIG. 5) juts above a trench 22 in which a small wagon 23 for removing the refuse is running.

Room 8, in which the manufactured wine is collected, is controlled in the conventional way by a gauge 24 cooperating with the pumping device (not shown), which is connected with the removing tube 9.

The wine-making apparatus works as follows:

The vintage admitted at 25 to the annular vat is subjected to fermentation and gives rise to the formation of a marc head, not shown, which floats on the surface and is continuously removed through hopper 10 and pipe 11, whereas the formed wine passes from vat 5 into room 8 after crossing grids 7 and can be withdrawn through pipe 9, with impurities being withdrawn through pipe 16.

It should be understood that the wine-making apparatus has been described and shown by way of example only and that a number of minor changes could be brought to the embodiment described and shown while remaining within the scope of the invention. Thus, especially, the slopes of the bottom could be other than that elected and several emptying doors, distributed over the periphery of the apparatus, which could also have a conical bottom, could be provided.

Again, a cooling has been mentioned, but it is clear that it would also be possible, in order to start a difficult fermentation, to cause a heating fluid rather than a cooling one to flow through the central tower.

The central tower could also, if desired, be filled with wine to be warmed up produced in another vinification unit.

I claim:

1. Continuous-flow wine-making apparatus comprising two coaxial towers, the central of said towers being divided by an intermediary inclined bottom into an upper wine room along which extend annular filtering grids and a lower room which is entirely filled with a thermal regulation fluid, especially cooling water, hot water or heating steam.

2. An apparatus according to claim 1, in which the intermediary bottom which is inclined with respect to the horizontal has at the lower edge thereof channels for removing the deposits which accumulate below the grids for filtering the wine.

3. An apparatus according to claim 1, in which the slope of the intermediary grid with respect to the horizontal is of about 30°.

4. An apparatus according to claim 1, further comprising an annular vat surrounding said towers extending from the bottom to the top of the apparatus, and provided at the bottom thereof with a controlled-opening emptying door which gives access to a ramp for removing the deposits of the annular tower.

5. An apparatus according to claim 4, in which the annular vat is provided in the lower part thereof with an inclined bottom the lowermost part of which reaches said door, said door being flush with a removing ramp.

6. An apparatus according to claim 5, further comprising a trench, in which moves a small waggon receiving the deposits which flow downwardly from the inclined bottom of the apparatus through the controlled-opening door and above which juts the removing ramp, provided at the base of the apparatus.

7. An apparatus according to claim 5, in which the slope of the inclined bottom of the annular vat is at least equal to that of the intermediate bottom provided under the room for the manufactured wine.

8. An apparatus according to claim 1, further comprising an inlet and an outlet for a cooling liquid provided in the lower room respectively at the base of said central tower and at the point where the wall of said lower room meets the intermediary bottom separating said lower room from the manufactured-wine mass.

9. An apparatus according to claim 1, in which the cooling liquid is water.

10. An apparatus according to claim 1, in which the cooling liquid is wine to be warmed up produced in a neighboring vinification unit.

* * * * *